Figure 1:
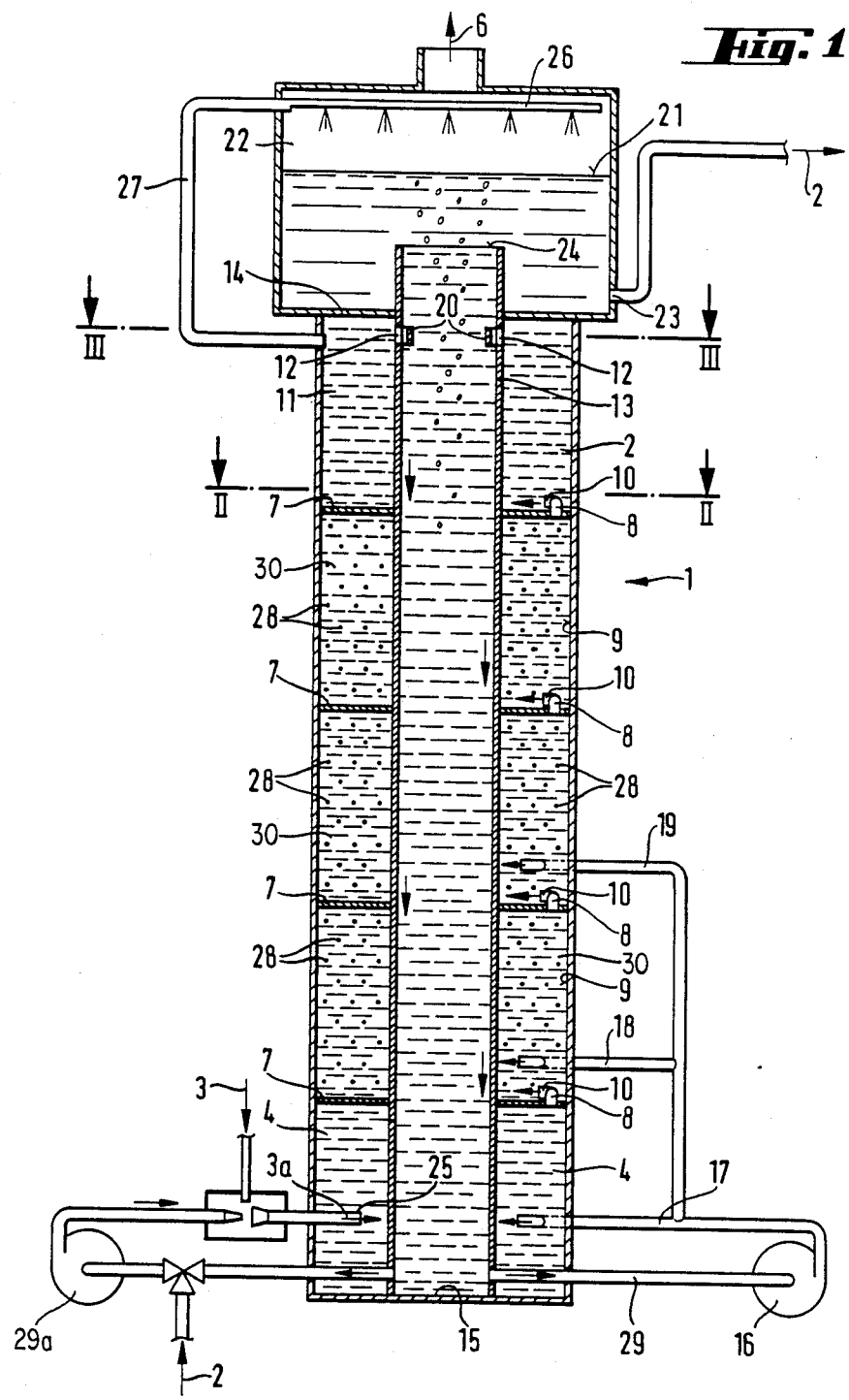
Figure 2:
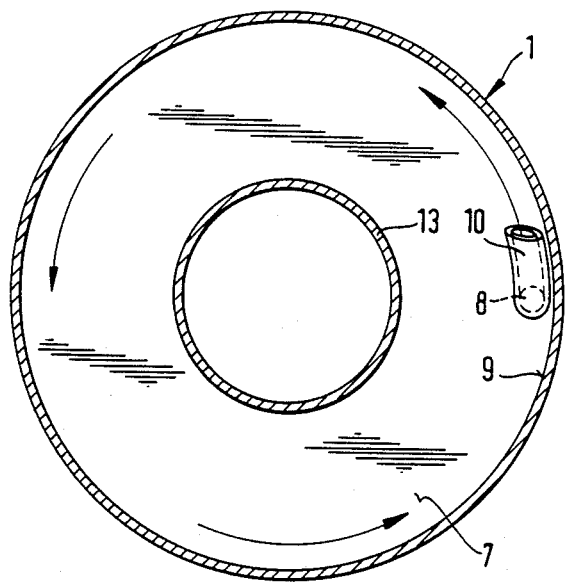
Figure 3:
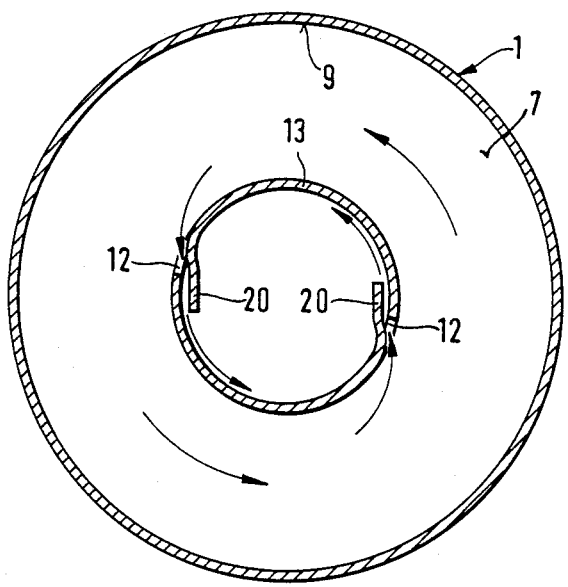

United States Patent [19]

Velebil et al.

[11] Patent Number: 4,832,848
[45] Date of Patent: May 23, 1989

[54] METHOD OF AND APPARATUS FOR ESTABLISHING AND MAINTAINING DISPERSIONS OF LIQUID AND GASEOUS FRACTIONS

[76] Inventors: Gerhard Velebil, Im Brühl, D-7846 Schliengen 3, Fed. Rep. of Germany; Christopher J. Harris, Henstridge House Templecombe, Somerset BA8 0QG, Henstridge, Great Britain

[21] Appl. No.: 80,633

[22] Filed: Jul. 31, 1987

[30] Foreign Application Priority Data

Aug. 2, 1986 [DE] Fed. Rep. of Germany ....... 3626231

[51] Int. Cl.$^4$ .............................. C02F 3/06; C02F 3/22
[52] U.S. Cl. ................................... 210/617; 210/621; 210/629; 210/195.1; 210/150
[58] Field of Search .............. 210/621, 629, 631, 194, 210/195.1, 197, 512.1, 150, 151, 617, 628, 622

[56] References Cited

U.S. PATENT DOCUMENTS

| | | | |
|---|---|---|---|
| 4,251,371 | 2/1981 | Bauer et al. | 210/197 |
| 4,411,780 | 10/1983 | Suzuki et al. | 210/150 |
| 4,425,231 | 1/1984 | Fujimoto et al. | 210/629 |
| 4,648,973 | 3/1987 | Hultholm et al. | 210/629 |
| 4,663,046 | 5/1987 | Feldkirchner et al. | 210/616 |
| 4,680,119 | 7/1987 | Franklin, Jr. | 210/629 |
| 4,707,252 | 11/1987 | Durot et al. | 210/197 |

FOREIGN PATENT DOCUMENTS

| | | |
|---|---|---|
| 0010571 | 5/1980 | European Pat. Off. . |
| 0003548 | 8/1987 | European Pat. Off. . |
| 2830126 | 1/1980 | Fed. Rep. of Germany . |
| 59-19585 | 2/1984 | Japan ............................ 210/151 |

*Primary Examiner*—Benoit Castel
*Attorney, Agent, or Firm*—Peter K. Kontler

[57] ABSTRACT

A dispersion of air or oxygen in liquid sewage and/or or sludge is admitted tangentially into the lower portion of an upright vessel wherein the dispersion rises and is compelled to flow through eccentric flow restricting passages in several superimposed horizontal partitions so that the dispersion is repeatedly induced to form a turbulent helical flow. The rising dispersion flows around a tube which returns a portion of the dispersion into the lower part of the vessel and causes the remaining portion to overflow into a receptacle having an outlet at a level below the open top of the tube. The dispersion which descends in the tube is readmitted tangentially into one or more chambers which are separated from each other by the partitions in the vessel and communicate with each other by way of the respective flow restricting passages.

29 Claims, 2 Drawing Sheets

METHOD OF AND APPARATUS FOR ESTABLISHING AND MAINTAINING DISPERSIONS OF LIQUID AND GASEOUS FRACTIONS

BACKGROUND OF THE INVENTION

The invention relates to a method of and to an apparatus for establishing and maintaining dispersions of liquid and gaseous fractions, particularly for dispersing oxygen, air and/or other oxygen-containing gases in liquid sludge and/or sewage. More particularly, the invention relates to improvements in methods and apparatus which can be utilized to carry out biochemical processes involving intimate contact of liquid fractions with gaseous fractions and/or microorganisms in a reactor, preferably in an upright vessel.

It is known to disperse a gaseous fraction in a liquid fraction and to cause the resulting dispersion to flow upwardly in a vessel wherein the liquid fraction is discharged at the top and the spent gaseous fraction which becomes separated from the liquid fraction is evacuated at the top independently of the treated liquid fraction. An apparatus which can be used for the practice of such method is disclosed in German patent application Ser. No. P 35 36 057.7. An advantage of such apparatus is that the period of dwell of the dispersion therein is relatively long even though the vessel is relatively short. The apparatus of this application comprises an inlet for admission of the dispersion into and substantially tangentially of the lower portion of the vessel, and a conduit which returns a portion of or the entire dispersion from the upper portion into the lower portion of the vessel for recirculation, i.e., for longer-lasting contact of the liquid and gaseous fractions. Intensive contact between the liquid and gaseous fractions is of particular importance if the apparatus is used as a means for initiating and promoting biochemical reactions, especially reactions of air and/or other oxygen-containing gases with active biomasses in a liquid medium. Such intensive contact contributes to the economy of the operation by ensuring that the treatment is completed within a relatively short interval of time and that the admitted gaseous fraction is utilized with a high degree of effectiveness. Moreover, it is relatively simple to maintain the temperature of the dispersion at an optimum value. All this is ensured by maintaining the gaseous fraction in desirable intimate contact with the liquid or liquefied fraction for a sufficiently long interval of time.

The method and apparatus of the aforementioned German application are simple and effective. However, it has been found that the path along which the dispersion rises in the vessel is often too short unless the height of the vessel is unduly increased. This is due to the fact that friction-induced deceleration of the dispersion in the vessel entails a pronounced reduction of the rate and intensity of circulation already at a level rather close to the inlet of the vessel. Moreover, the decelerated gaseous and liquid fractions exhibit a pronounced tendency to become separated from each other. As the tendency of the dispersion to circulate decreases or vanishes, the dispersion begins to flow upwardly along a more or less straight path so that the period of dwell in the vessel and hence the reaction times ar reduced accordingly.

OBJECTS AND SUMMARY OF THE INVENTION

An object of the invention is to provide a novel and improved method of treating a liquid or liquefied fraction with a gaseous fraction in such a way that the treatment is completed within a relatively short interval of time and in a relatively small vessel even though the liquid fraction covers a considerable distance while remaining in intimate contact with the gaseous fraction.

Another object of the invention is to provide a method which ensures that the intensity of reaction between the gaseous and liquid fractions remains unchanged or fluctuates very little in each and every portion of the path wherein the fractions are caused to interact.

A further object of the invention is to provide a simple but highly efficient method of intimately contacting sewage and/or sludge with oxygen-containing gases and microorganisms.

An additional object of the invention is to provide a method of repeatedly inducing an ascending dispersion of gaseous and liquid fractions to flow along a path which deviates from a straight path.

Still another object of the invention is to provide a method which renders it possible to subject a liquid fraction to intensive treatment by intimate contact with a gaseous fraction in a relatively simple and inexpensive apparatus.

A further object of the invention is to provide a novel and improved apparatus for the practice of the above outlined method.

An additional object of the invention is to provide a novel and improved vessel for use in the above outlined apparatus and for the practice of the above outlined method.

Another object of the invention is to provide the apparatus with novel and improved means for repeatedly inducing a dispersion of gaseous and liquid fractions to flow along an ideal or nearly ideal path while being conveyed between two levels which are relatively close to each other.

A further object of the invention is to provide novel and improved means for subdividing the vessel of the above outlined apparatus and novel and improved means for influencing the speed and pressure of the conveyed gaseous and liquid fractions.

One feature of the present invention resides in the provision of a method of treating a liquid fraction with a gaseous fraction, particularly of intimately contacting sewage and/or sludge with air and/or oxygen. The method comprises the steps of dispersing the gaseous fraction in the liquid fraction, conveying the resulting dispersion upwardly along an elongated at least partially helical path through a series of superimposed chambers, throttling the flow of the dispersion between at least two superimposed chambers, damming the flow of the dispersion in the region of the upper end of the path, dividing (at least at intervals) the dammed dispersion into first and second streams, returning one of the streams into or close to the lower end of the path, and evacuating the other of the streams from the upper end of the path. The method preferably further comprises the steps of interrupting the upward flow of the dispersion between the two superimposed chambers and throttling the flow of the dispersion in the region of the upper end of the path simultaneously with or immediately preceding the dividing step. The returning step can include conveying the one stream downwardly along a second path which is surrounded by the elongated path. The other stream can be temporarily stored in a receptacle on top of the elongated path prior to the evacuating step.

The first throttling step can include throttling the upward flow of the dispersion between several superimposed chambers.

The conveying step can include maintaining the dispersion (e.g., by means of a pump) at an elevated pressure, and the first throttling step can include raising the pressure of the dispersion in the lower chamber of the two chambers.

In accordance with a presently preferred embodiment of the method, the conveying step includes inducing the dispersion to rise within an upright vessel having a housing or shell which is tubular at least in the region of the upper chamber of the two superimposed chambers, and the first throttling step preferably comprises placing between the two superimposed chambers a substantially horizontal partition and providing the partition with at least one passage which induces an at least substantially horizontal flow of the dispersion from the lower chamber into the upper chamber of the two superimposed chambers and substantially tangentially of the shell.

The first throttling step can include throttling the upward flow of the dispersion between a plurality of additional superimposed chambers at a level above the lower chamber of the aforementioned pair of superimposed chambers and at angularly offset locations of the path, e.g., diametrically opposite each other with reference to the axis of the vessel. The first throttling step then further comprises placing substantially horizontal partitions between superimposed chambers and providing the partitions with flow restricting passages which induce a substantially horizontal flow of the dispersion, at least immediately above the respective partitions.

The returning step can include admitting at least a portion of the one stream into at least one of the chambers. The admission preferably takes place at the level or at levels close to and above the partition or partitions in the vessel and preferably tangentially or nearly tangentially of the respective portion of the shell.

The gaseous fraction forms bubbles which rise in the up-path at a predetermined speed. The conveying and throttling steps are preferably selected and/or regulated in such a way that the dispersion is maintained at an elevated pressure which suffices to ensure that the upward flow of the dispersion takes place at a speed exceeding the predetermined speed.

The pressure of the dispersion can be reduced in the upper portion of the path upon completion of the dividing step; at least the other stream is then circulated to accelerate such other stream prior to the evacuating step (this entails a separation of the gaseous fraction so that the evacuating step can include evacuation of liquid fraction alone or of a liquid fraction with a relatively low percentage of gaseous fraction therein).

The method can also comprise the step of confining a carrier material for microorganisms in at least one of the chambers so that the ascending dispersion is caused to intimately contact the microorganisms.

Another feature of the present invention resides in the provision of an apparatus for treating a liquid fraction with a gaseous fraction, particularly for intimately contacting liquid sewage and/or sludge with air and/or oxygen. The apparatus comprises an upright vessel with a housing or shell having a lower portion, an upper portion and at least one partition dividing the interior of the vessel into an upper chamber and a lower chamber. Such chambers are located between the upper and lower portions of the vessel, and the partition has at least one flow restricting or throttling passage. The lower portion of the vessel has an inlet and the upper portion of the vessel has an outlet, and the apparatus further comprises means (e.g., a venturi) for admitting into the inlet a dispersion of liquid and gaseous fractions at a pressure such that the dispersion rises in the vessel toward the outlet and flows through the passage. The passage is oriented and dimensioned in such a way that it imparts to a portion at least of the flow of dispersion a substantially helical shape, i.e., the rising dispersion flows along an elongated path which includes at least one helical portion. The vessel preferably further comprises means for damming the flow of dispersion in the upper portion of the vessel, and the apparatus further comprises a return conduit having an intake in the upper portion of the vessel, a discharge end in the lower portion of the vessel and at least one opening for admission of the dispersion from the upper portion of the vessel into the conduit in the region of the damming means.

The vessel can further comprise one or more additional substantially horizontal partitions and additional flow restricting passages in such additional partitions so as to repeatedly induce a helical flow of the rising dispersion. The partitions are disposed at different levels and are preferably equidistant from each other. Each passage is or can be defined by a substantially tubular flow-restricting member, and each such member preferably extends substantially tangentially of the adjacent tubular portion of the shell. Each flow-restricting member is preferably located in the upper one of two neighboring chambers which are separated from each other by the respective partition, and each tubular member is or can be adjacent the corresponding tubular portion of the shell.

The apparatus can further comprise conduits or like means for diverting dispersion from the aforementioned return conduit into at least one of the chambers. Each diverting means has an outlet which is preferably adjacent the upper side of the partition beneath the respective chamber. The return conduit can include an upright pipe which is surrounded by the shell of the vessel, preferably in such a way that the pipe is concentric with the shell.

The damming means can include a horizontal or nearly horizontal top wall which is disposed at least slightly above and is preferably close to the intake of the return conduit. The return conduit can be provided with one or more inwardly extending nipples each of which defines an intake for admission of dispersion from the upper portion of the vessel into the return conduit. Each nipple can be disposed substantially tangentially of the return conduit.

The upper portion of the vessel can include an enlarged receptacle above the damming means, and the return conduit preferably extends upwardly and above the damming means and has an open top so that the dispersion can overflow into the receptacle. The outlet in the upper portion of the vessel is then provided in the receptacle at a level below the open top of the return conduit.

Each partition can include a washer-like plate or panel which is sealingly secured to the return conduit and to the shell.

The admitting means can include or can cooperate with one or more pumps which can maintain the dispersion, even in the region of the damming means, at a speed of approximately ten meters per second in spite of the provision of one or more flow restricting passages between the inlet in the lower portion of the vessel and the damming means.

The apparatus can further contain carrier material for microorganisms in at least one of the chambers, and the admitting means is preferably arranged to induce the dispersion to flow at a speed such that the carrier material remains in the one chamber (i.e., that it does not flow into the chamber or chambers above the one chamber or into the outlet) while the microorganisms on such carrier material are being contacted with the rising and circulating dispersion.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a schematic central vertical sectional view of an apparatus which embodies one form of the invention;

FIG. 2 is a plan view of a partition in the vessel of the apparatus which is shown in FIG. 1; and FIG. 3 is a plan view of a top wall constituting a damming means in the upper portion of the upright vessel of the apparatus which is shown in FIG. 1.

DESCRIPTION OF THE PREFERRED EMBODIMENTS

The apparatus which is shown in FIG. 1 comprises an upright vessel 1 having a tubular (preferably at least partly cylindrical) housing or shell 9 with a lower portion 4, and upper portion 11 and a plurality of superimposed chambers 30 separated from each other by horizontal partitions 7 of the type shown in FIG. 2. The apparatus can be used as a reactor to carry out biochemical processes, e.g., to intimately contact liquid or liquefied sludge or sewage with pure oxygen, with air or with another oxygen-containing gas. The gaseous fraction is supplied at 3 from a suitable source, not shown, and the liquid fraction is supplied at *29a*, again from a source which is not shown in the drawing. The means *3a* for admitting a dispersion of the gaseous fraction in the liquid fraction into the lower portion 4 of the shell 9 (namely into an inlet 25 which is disposed substantially tangentially of the shell to induce a circulation of the admitted dispersion 2 while the dispersion rises in the vessel 1) can comprise a venturi or the like and a pump (as at *29a*) which causes the dispersion to enter the vessel 1 at an elevated pressure. The upper portion 11 of the vessel 1 includes a radially enlarged receptacle 22 having a top wall with an opening or outlet 6 for evacuation of gaseous fraction which has become separated from the dispersion 2. The receptacle 22 is further provided with an outlet 23 which serves for evacuation of some of the dispersion 2 which has risen in the shell 9 from the inlet 25 through successive chambers 30 and ultimately into the receptacle 22.

The rising dispersion 2 flows along an elongated substantially helical path which surrounds an upright return conduit 13 (hereinafter called tube for short). The tube 13 is preferably concentric with the shell 9 and its top is open, as at 24, and extends above a top wall 14 which is provided in the upper portion 11 of the vessel 1 beneath the receptacle 23 and serves as a means for damming the flow of rising dispersion 2 so that the dispersion ceases to flow upwardly and is compelled to enter the upper portion of the tube 13 by way of one or more (e.g., two, see FIG. 3) substantially tangentially extending nipples 12 defining throttling orifices at a level slightly beneath the top wall or damming means 14.

The rising dispersion 2 is caused to flow along a helical path because the inlet 25 is designed to admit a stream of dispersion substantially tangentially of the lower portion 4. In addition, each of the horizontal partitions 7 defines a passage 8 which extends substantially tangentially of and is adjacent the internal surface of the respective (tubular) portion of the shell 9 so that the tendency of the dispersion 2 to flow along a helical path is enhanced at several levels between the inlet 25 and the top wall 14. The passages 8 are defined by substantially horizontal tubular throttling or flow restricting members 10 in the form of relatively short elbows which are disposed at levels above the respective partitions 7. Each such partition actually interrupts the upward flow of the major portion of the body of dispersion in the shell 9, and the dispersion is then compelled to flow in the respective passage 8 in a manner as indicated by the solid-line arrow in FIG. 2, i.e., close to and along the internal surface of the shell 9 and circumferentially of the tube 13. Such repeated inducement of the dispersion 2 to flow along a helical path prolongs the period of dwell of the dispersion in the vessel 1 and ensures that the treatment can be completed even if the vessel is relatively short. The feature that the passages 8 which are defined by the flow restricting or throttling members 10 do not merely provide simple openings for the dispersion 2 but compel the dispersion to flow circumferentially of and around the tube 13 ensures that the path along which the dispersion flows from the inlet 25 to the top wall 14 is surprisingly long even though the distance between the levels of the inlet 25 and the top wall 14 is rather short. It will be noted that the partitions 7 and their flow restricting members 10 perform several important functions, namely of repeatedly interrupting the upward flow of the dispersion 2 as well as of repeatedly inducing the dispersion to flow along a helical path rather than simply vertically or nearly vertically upwardly.

The pressure at which the dispersion 2 is admitted into the lower portion 4 of the vessel 1 is preferably such that the dispersion is stabilized, i.e., that the gaseous fraction does not tend to become segregated from the liquid fraction. The application of such relatively high pressure also contributes to the possibility of completing the treatment of the liquid fraction in a relatively short vessel. The pressure in the vessel 1 is further increased by the partitions 7 each of which defines a relatively small passage 8 for the flow of dispersion from the respective lower chamber into the respective upper chamber 30. Each partition 7 acts not unlike the top wall or damming means 14 except that the latter does not define a passage for direct flow of the dispersion from the topmost chamber 30 into the receptacle 22. Instead, the dispersion must pass though the nipples or nozzles 12 and must overflow the open top 24 of the tube 13. The operator of the apparatus can simulate a water column of any desired height by simply increasing or reducing the rate of admission of dispersion into the inlet 25, i.e., by selecting the pressure of dispersion in the shell 9 of the vessel 1. The pressure of dispersion 2 is reduced, particularly to atmospheric pressure, in the receptacle 22.

It is preferred to provide the vessel 1 with a relatively large number of partitions 7 and to install the neighboring partitions at the same distance from each other. This ensures that the rising dispersion 2 is repeatedly induced to flow along a helical path at several levels which are uniformly spaced apart from each other between the upper and lower portions 11 and 4 of the vessel 1. At the same time, the partitions 7 repeatedly interrupt the upward flow of the dispersion and ensure that the dispersion is repeatedly subjected to an effective flow-restricting action, i.e., while flowing through successive passages 8 on its way from the inlet 25 toward and into the flow-throttling orifices which are defined by the nipples 12 in the upper portion of the tube 13. It will be seen that the dispersion is repeatedly throttled by the partitions 7 and that the dispersion which has risen above the topmost partition 7 is throttled again while flowing from the upper portion 11 of the shell 9 into the upper portion of the tube 13 by way of the nipples 12. The flow-discharging portions of the elbow-like flow restricting members 10 are preferably horizontal and are preferably closely adjacent the upper sides of the respective partitions 7 so as to ensure that the lowermost "helix" of dispersion in each chamber 30 is located in or close to a horizontal plane and that the body of dispersion in each chamber 30 can form several superimposed "helices" before reaching the underside of the partition 7 above such chamber or the top wall 14.

The tendency of the dispersion 2 to circulate in the chambers 30 can be enhanced still further by providing some or all of the partitions 7 with pairs of three or more circumferentially spaced-apart passages 8.

That stream of the dispersion 2 which enters the upper portion of the tube 13 by way of the nipples 12 and flows downwardly is returned into the lower portion of the path for the rising dispersion by a pump 16 which draws the dispersion from the lower portion 15 of the tube 13 by way of a conduit 29 and diverts at least some of the thus withdrawn dispersion into conduits 17, 18 and 19 which respectively admit streams or streamlets of dispersion substantially tangentially of the shell 9 into the lower portion 4 (this lower portion can be said to constitute the lowermost chamber in the interior of the shell 9), into the chamber 30 above the lowermost partition 7, and into the chamber 30 above the next-to-the-lowermost partition 7. Such streams or streamlets of dispersion are admitted close to the upper sides of the respective partitions (the bottom wall of the vessel 1 can be said to constitute a partition beneath the lower portion or chamber 4) and they enhance the tendency of dispersion 2 to flow along a helical path while ascending from chamber to chamber to ultimately enter the upper portion of the tube 13. Recirculation of some or all of the stream which flows downwardly in the tube 13 contributes to a further significant extension of the period of intimate contact between the liquid and gaseous fractions of the dispersion.

The number of chambers which receive recirculated dispersion can be reduced to two or one or increased to four or more.

A substantial percentage of gaseous fraction is caused to become separated from the liquid fraction during flow through the orifices which are defined by the nipples 12 in the upper portion of the tuber 13. This is due to the fact that the cross-sectional area of each orifice is relatively small and that such orifices are formed in part by arcuate guide means or baffles 20 which extend circumferentially along the internal surface of the tube 13 and cause the dispersion which enters the upper portion of the tube to circulate at an elevated speed with attendant pronounced segregation of liquid and gaseous fractions under the action of centrifugal force. The gaseous fraction rises in the receptacle 22 and is evacuated by way of the outlet 6. Thus, the stream which descends in the tube 13 contains a relatively small percentage of gaseous fraction. The outlet 6 can admit the segregated gaseous fraction into a suitable cleaning, filtering or like unit, not shown.

The number of helices which are described by the dispersion 2 during flow from the inlet 25 to the flow-restricting nipples 12 in the upper portion of the tube 13 (and hence the average reaction time) can be regulated in a number of different ways, for example, by varying the rate of admission of untreated dispersion via inlet 25 and/or by varying the rate of admission of partially treated dispersion into one or more chambers 30 by way of the respective conduit or conduits 17, 18, 19. The height of the column of dispersion in the tube 13 rises in response to increasing rate of admission of untreated dispersion via inlet 25. The receptacle 22 can receive dispersion only when such dispersion overflows the open top 24 of the tube 13. The conduit which is connected to the outlet 23 evacuates all of the dispersion which overflows into the receptacle 22.

If the column of dispersion in the tube 13 does not reach the open top 24 and the admission of untreated dispersion via inlet 25 is interrupted, the dispersion which happens to be confined in the vessel 1 is or can be recirculated once, twice or more than twice, i.e., as often as desired. Such dispersion is pumped at 16 into the conduits 17–19 to enter the respective chambers and to rise in the space around the tube 13 in order to enter the tube via nipples 12 and to return into the lower portion 15 of the tube, i.e., into the range of the pump 16.

On the other hand, if the inlet 25 continuously receives a stream of fresh (untreated) dispersion, a stream of dispersion continuously overflows the open top 24 of the tube 13 and is evacuated from the receptacle 22 via outlet 23 which, as explained above, is located at a level below the open top 24. The average period of dwell of dispersion in the apparatus can be regulated by varying the rate of admission of fresh dispersion via inlet 25.

In order to reduce the likelihood of foaming, the receptacle 22 preferably contains a spray pipe 26 which is disposed close to the top of the receptacle and receives dispersion from the upper portion 11 by way of a supply conduit 27. The tendency of the dispersion to form is most pronounced in the region of the open top 24 of the tube 13, i.e., where the segregated gaseous fraction ascends in the receptacle 22 on its way toward the outlet 6. The tendency of ascending gaseous fraction to cause foaming is drastically reduced by sprays of dispersion which are discharged by the orifices of the pipe 26 and descend on top of the body of dispersion in the receptacle 22. The pressure in the upper portion 11 of the vessel 1 (beneath the top wall 14) is sufficiently high to ensure that the conduit 27 can supply the orifices of the spray pipe 26 with a continuous stream of dispersion.

The interruption of upward flow of the dispersion 2 by each partition 7 ensures that the gaseous fraction does not become separated from the liquid fraction, even if the circulation velocity of the rising dispersion is relatively low. Moreover, throttling of the flow of dispersion 2 on its way through the flow restricting members 10 of the partitions 7 ensures that the pressure of the dispersion in the chamber beneath each member 10 rises to counteract an increasing coalescence and to thus stabilize the dispersion. Such mode of treating the dispersion ensures that the period of dwell of gaseous fraction in the dispersion is much longer than when the dispersion is free to flow freely in a reactor vessel. Moreover, each partition 7 brings about a renewed intimate mixing of the gaseous and liquid fractions. This, too, enhances the quality of treatment of the liquid fraction and allows for relatively rapid completion of treatment in a compact apparatus. As mentioned above, the period of dwell of dispersion 2 in the vessel 1 can be increased practically at will by the simple expedient of shutting off the admission of fresh dispersion and by recirculating the dispersion in the apparatus by the pump 16 and conduits 17–19 as often as desired.

The energy which is required to effect a circulation of dispersion as soon as the dispersion enters the lower portion of a chamber 30 is supplied as a result of the establishment of elevated pressure in the upper portion of each chamber 30, i.e., beneath each partition 7. The potential energy in the form of pressure is converted into kinetic energy as a result of the flow of dispersion through the passages 8 which are defined by the flow restricting members 10, i.e., the velocity of the dispersion increases as soon as the dispersion leaves a lower chamber. The increase of velocity is limited to the lower portion of the next-higher chamber, i.e., to the region immediately or closely above a partition 7. The aforediscussed configuration of the flow restricting members 10 (namely the configuration which ensures that the initial flow of the dispersion which enters the lower portion of a chamber 30 is horizontal or nearly horizontal) and the aforediscussed orientation of the members 10 (so that the flow is substantially tangential to the adjacent tubular portion of the shell 9) ensure that the flow of the dispersion is circular and that the rising dispersion flows along a helical path which is much longer than the shortest distance between the inlet 25 and the nipples 12. Repeated infusion of energy which is used to bring about a circulatory movement of the dispersion ensures that such circulatory movement takes place all the way between the inlet 25 and the upper portion of the tube 13 with minor interruptions in the regions of the partitions 7. As mentioned above, the partitions 7 can be provided with several suitably distributed passages to further enhance the tendency of the rising dispersion to flow along a helical path. For example, at least one partition 7 can be provided with two passages 8 which are disposed diametrically opposite each other with reference to the axis of the tube 13. The provision of two or more passages in one or more partitions 7 renders it possible to achieve a desired circulation of the dispersion while the speed of the dispersion which issues from the passages is lower than in the case of partitions having a single passage. This enhances the uniformity of the circulating dispersion. The number of passages 8 in each partition 7 (or in some of the partitions) can be increased to three or more.

The purpose of the throttling action of nipples 12 beneath the top wall 14 is to further prolong the interval of intimate contact between the gaseous and liquid fractions. Such intervals can be lengthened still further by recirculating the treated dispersion by way of the tube 13, pump 16, one or more diverting conduits (17–19) and chambers 30 back to the nipples 12. Thus, the average period of dwell of the dispersion in the apparatus including the vessel 1 can be varied within a very wide range (e.g., between 4 and 12 minutes). The operators can further control the quantity of recirculated dispersion, e.g., by reducing or increasing the throughput of the pump 16 and/or by closing the valve (not shown) in one or more diverting conduits (17–19). Moreover, the operator or operators can control the timing of recirculation of the dispersion by starting or stopping the pump 16. All this enables the operator or operators to optimize the treatment of the liquid fraction, the output of the apparatus, the energy consumption of the apparatus, the efficiency of utilization of the gaseous fraction, the efficiency of utilization of reaction promoting microorganisms and/or chemicals in the vessel 1 and/or other variables.

An important advantage of the improved apparatus is that repeated circulation of the dispersion on its way from the inlet 25 into the upper portion of the tube 13 is achieved in a very simple and inexpensive way, i.e., by the simple expedient of installing one or more partitions 7 with suitably dimensioned and oriented passages 8 wherein the flow of dispersion is throttled and which ensure that the dispersion begins to circulate around the tube 13 as soon as it enters the lower portion of a chamber above a partition. The number of partitions will be selected as a function of frictional losses and in dependency on the dimensions of the apparatus.

The illustrated straight tube 13 can be replaced with an otherwise configurated tube without departing from the spirit of the invention. A straight cylindrical tube is preferred because of its lower cost and simplicity of installation. The diameter of the tube 13 can be between one-third and one-fourth the diameter of the shell 9. Such dimensioning of the tube 13 has been found to exert a beneficial effect upon the flow of dispersion 2 in the chambers which surround the tube and are, in turn, surrounded by the shell 9. The utilization of a tube 13 having a relatively large diameter is desirable and advantageous because this contributes to more satisfactory circulation of dispersion in the chambers 30. The reason is that the rate of circulation at the very center of a chamber 30 (in the absence of the tube 13) or close to such center would be very low and could even adversely affect the overall flow of dispersion from the inlet 25 to the region immediately beneath the top wall 14. Were the tube 13 placed outside of the shell 9 or if the tube 13 were omitted altogether, the dispersion 2 could develop a pronounced upward flow in the central region of the shell 9 which would result in a less satisfactory treatment or could even result in insufficient treatment of some or all of the dispersion. Such problems are avoided by the simple expedient of utilizing a large-diameter tube 13.

The provision of seals between the radially innermost portions of the partitions 7 and the tube 13 on the one hand, and the peripheral portions of partitions 7 and the shell 9 on the other hand, ensures that the entire dispersion is compelled to flow through the passages 8 and is thus set in a circular motion as soon as it enters the lower portion of the next higher chamber. The partitions 7 further serve to act as supports or platforms for carrier material of microorganisms which can be used in the apparatus to promote the treatment of the liquid fraction. Such carrier material accumulates on the partitions when the apparatus is idle. Thus, the partitions prevent the carrier material from descending from chamber to chamber when the inlet 25 does not receive fresh dispersion and/or when the pump 16 is idle and the conduit 17, 18 and/or 19 does not admit pretreated dispersion into the respective chamber or chambers.

The diameter of the tube 13 is or can be constant from end to end. This is particularly desirable and advantageous in the upper part of the tube because such dimensioning enhances the separation of gaseous fraction from the liquid fraction of dispersion which enters the upper portion of the tube 13 and is accelerated and caused to circulate at a relatively high speed as a result of the dimensioning, orientation and location of the nipples 12 which provide orifices for the flow of dispersion from the region immediately below the top wall 14 into the tube 13. The dimensions of the orifices in the nipples 12 can be readily selected in such a way that the dispersion which enters the upper portion of the tube 13 begins to circulate at a relatively high speed which is sufficient to ensure that the action of centrifugal force suffices to bring about extensive separation of gaseous and liquid fractions, i.e., bubbles of the gaseous fraction will rise in the tube 13 toward and into the outlet 6 in the top portion of the receptacle 22. It is clear that segregation of gaseous and liquid fractions can be carried out in a separate container. The structure which is shown in the drawing (and wherein the segregation of gaseous fraction takes place in the upper portion of the tube 13) is preferred at this time because it contributes to simplicity, compactness and lower cost of the apparatus.

As mentioned above, the number of times a batch of dispersion 2 is recirculated in the apparatus can be selected practically at will by appropriate adjustment of the rate of admission of fresh dispersion via inlet 25 (or by interrupting the admission of fresh dispersion), by regulating the operation of the pump 16 and/or by selecting the number of diverting conduits which admit pretreated dispersion into the corresponding chamber or chambers as well as by selecting the rate of flow of dispersion in the selected diverting conduit or conduits.

The reaction velocity in various portions of the vessel 1 depends, to a considerable extent, upon the degree of concentration of microorganisms. In order to promote the reaction, one or more chambers or portions of the vessel 1 can contain a carrier material 28 (indicated schematically by broken horizontal lines) the surface of which carries a film or layer of microorganisms which can be said to form a microbiological lawn. Such microorganisms are available for uninterrupted treatment of the dispersion 2 which rises in the shell 9. The rate of upward flow of the dispersion is preferably selected in such a way that the carrier material 28 remains in the respective chamber or chambers, i.e., the carrier material is not caused to rise into the next-higher chamber or descend into the chamber below. In other words, the circulating dispersion is maintained in intimate contact with the microorganisms which are carried by the material 28 in the respective chamber or chambers. Each partition 7 is a washer-like panel the innermost portion of which is sealingly connected with the tube 13 and the peripheral portion of which is sealingly connected with the sell 9 so that the only path for the flow of dispersion 2 from chamber to chamber is by way of the respective passage 8. As mentioned above, the rate of upward flow of the dispersion and the cross-sectional areas of the passages 8 are or can be selected in such a way that the carrier material 28 remains confined in the respective chamber wherein it can float between the upper side of the partition 7 below the passage 8 above. It will be seen that, in addition to the aforediscussed functions, the partitions 7 also serve as a means for confining the carrier material 28 in the respective chambers.

Introduction of carrier material 28 for microorganisms into one or more chambers 30 is of particular importance in apparatus wherein the active biological material includes gradually growing microorganisms and/or microorganisms which can be readily washed away. Examples of such microorganisms are nitrogen-fixing bacteria or methane-forming bacteria. In contrast to heretofore known processes of such character, known as fluidized-bed or vibrating-layer methods, it is now proposed to impart; to the entire carrier material 28 and to the microorganisms thereon a circulatory movement as a result of the flow of dispersion 2 along a helical path, to retain the carrier material 28 in the respective chamber or chambers of the vessel 1, and to ensure that differences between the densities of carrier material and reaction product do not allow the carrier material to rise into the next-higher chamber or chambers. This ensures the establishment of a large surface-to-surface contact between the dispersion 2 and the microorganisms as well as a highly satisfactory intermixing of dispersion with the microorganisms. All this is achieved while the carrier material 28 remains confined to circulatory movements in the selected chamber or chambers of the vessel 1.

The metabolism of the microorganisms entails their growth on the particles of carrier material 28. Nevertheless, the aforediscussed mode of circulating the carrier material 28 in the selected chamber or chambers prevents the development of an excessively thick layer of microorganisms. One of the reasons for the prevention of development of overly thick layers is that the circulating particles of carrier material 28 rub against each other to thereby segregate and liberate a certain percentage of microorganisms. The segregated microorganisms constitute a freely flowing biological material having a specific weight which is much lower than that of the carrier material and/or of carrier material plus the microorganisms adhering thereto. Consequently, the thus liberated biological material is free to rise with the dispersion through the passages 8 of the partitions 7 and to ultimately enter the tube 13. Such self-cleaning action has been found to ensure the thickness of layers of microorganisms on the particles of carrier material 28 does not exceed an optimum value. Moreover, the segregated biological material is highly unlikely to clog the narrow passages 8 but is permitted to remain in long-lasting contact with the ascending flow of dispersion 2. The result is a surprisingly pronounced rise of reaction velocity because the microorganisms are in continuous intensive and large-area contact with the dispersion.

The carrier material 28 can consist of or can contain granular activated carbon, sand, brown coal, pellets of coke, anthracite or the like with a particle size of 0.2 to 3 mm.

The circulation velocity of the dispersion 2 is or can be selected in dependency on the density of introduced carrier material 28 so as to ensure that such material will circulate in the selected chamber or chambers without accumulating on the partition or partitions 7 therebelow and will not rise into the next-higher chamber or chambers. Thus, the helices of rising dispersion traverse the circulating carrier material on their way from a lower passage 8 into a higher passage with the resulting intimate contact between the dispersion and the microorganisms.

The biochemical reactions in the vessel 1 can be enhanced still further to a considerable extent by introducing different types of microorganisms into different chambers and by properly relating the selected microorganisms to the stages of treatment to which the rising flow of dispersion 2 has already been subjected on its way into a particular chamber. This ensures that the microorganisms in the corresponding chambers can optimize the respective biochemical conversion stage as determined by the function working relationship at the corresponding level of the vessel. To this end, the conditions for the growth of particular bacteria in various chambers of the vessel 1 can be optimized by appropriate selection of the concentration of gaseous fraction, temperature, extent of agitation of the dispersion and other parameters so as to ensure an optimizing of reactions between bacteria and the dispersion in the corresponding chambers. Thus, the aforediscussed subdivision of the interior of the vessel 1 into a series of superimposed chambers brings about the additional advantage that the biochemical conversion process can be regulated with a high degree of accuracy and in a simple, inexpensive and highly efficient way. The optimizing of circumstances for the existence and growth of one or more types of microorganisms in selected chambers of the vessel entails an optimizing of the biochemical activity of the microorganisms and hence an optimum treatment of the liquid fraction in a relatively short vessel and within a relatively short interval of time. Moreover, and even though the carrier material 28 is free (and actually compelled) to circulate in the selected chamber, the individual cultures of microorganisms remain confined in the respective chambers with the exception of those which are released by the particles of carrier material 28 as a result of the aforediscussed frictional engagement between neighboring particles of carrier material.

The selection of optimum conditions for the growth of microorganisms in one or more chambers can be effected in a relatively simple and inexpensive way. For example, the temperature in a selected chamber can be raised by the simple expedient of surrounding the respective portion of the shell 9 with an insulating layer or by dispensing with the cooling of such portion of the shell so that heat which is generated as a result of reactions in the respective chamber or chambers entails an automatic heating of the dispersion and microorganisms in the corresponding chamber or chambers. The percentage of gaseous fraction in a particular chamber can be regulated by the admission of controlled quantities of partially or fully treated dispersion by way of the conduit 17, 18, 19. Moreover, the nutritive substatum for microorganisms in a particular chamber can be optimized by introducing into the respective chamber a dispersion which has already undergone one or more previous treatments (such pretreated dispersion is also admitted via conduit 17, 18 and/or 19).

The carrier material 28 is preferably porous so that the microorganisms can settle in its pores and are less likely to be washed away into the next-higher chamber or chambers when the apparatus is in actual use. The feature that the carrier material 28 is caused to circulate in the respective chamber or chambers is desirable and advantageous because this ensures that the dispersion in each and every portion of such chamber is in continuous contact with the microorganisms as long as it remains in the respective chamber or chambers. Moreover, this entails a more effective and more rapid utilization of the gaseous fraction. Uniform distribution of gaseous fraction in the dispersion, coupled with stabilized circulation of the dispersion in the chambers of the vessel and with uniform action of microorganisms upon each portion of the dispersion in the respective chamber, ensures an optimum treatment of the dispersion within a short period of time and in a small apparatus.

It has been found that the improved method can be carried out with a high degree of efficiency in an apparatus employing a vessel 1 with a height of up to 8 meters and an overall diameter of not more than 4 meters. The partitions 7 can be installed at 1–2 meter intervals. It was further found that the operation of the apparatus is quite satisfactory if the velocity of the rising dispersion 2 is selected with a view to ensure that the rate of flow of dispersion from the space beneath the top wall 14 into the non-pressurized interior of the tube 13 is approximately 10 meters per second. This results in segregation of a desired percentage of gaseous fraction which then rises in the receptacle 22 to be evacuated by way of the outlet 6. The just described speed of the dispersion which enters the upper portion of the tube 13 further ensures that the circulation velocity of the dispersion 2, even in the upper portion 11 of the vessel 1, exceeds the speed at which bubbles of gaseous dispersion rise in the vessel. In order to satisfy such requirement, the helical path for the dispersion between the inlet 25 and the nipples 12 is much longer than the shortest distance between such inlet and the upper portion of the tube 13. The just mentioned selection of the speed of flow of the dispersion ensures that the gaseous fraction can remain in intimate and longlasting contact with the liquid fraction within a relatively short vessel and with much better results than if the dispersion were permitted to flow, without obstructions, along an upwardly or downwardly extending path.

It was further discovered that a highly satisfactory period of dwell of dispersion 2 in the vessel 1 is between 4 and 12 minutes. This means that the overall volume of dispersion which is treated per unit of time (60 minutes) is between 5 and 15 times the capacity of the apparatus. However, it is clear that the period of dwell can be shortened to less than 4 minutes or raised above 12 minutes, depending on the nature of the dispersion and upon the desired nature and extent of treatment. The period of dwell of dispersion can be selected with a view to ensure an optimum utilization of the gaseous fraction and/or to ensure that the method can be practiced while the concentration of the reactive gas remains within a desired range.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A method of treating a liquid fraction with a gaseous fraction, comprising the steps of dispersing the gaseous fraction in the liquid fraction; conveying the resulting dispersion upwardly along an elongated at least partially helical path through a series of superimposed chambers; a first throttling step of throttling the flow of the dispersion between at least two superimposed chambers; interrupting the upward flow of the dispersion between said two superimposed chambers; damming the flow of the dispersion in the region of the upper end of said path; at least intermittently dividing the dammed dispersion into first and second streams; a second throttling step of throttling the flow of the dispersion in the region of the upper end of the path simultaneously with or immediately preceding said dividing step; returning one of the streams into the lower end of said path, including conveying the one stream downwardly along a second path which is surrounded by said elongated path; and evacuating the other of said streams from the upper end of said path.

2. The method of claim 1, further comprising the step of temporarily storing the other stream prior to said evacuating step.

3. The method of claim 1, wherein said first throttling step includes throttling the upward flow of the dispersion between several superimposed chambers.

4. The method of claim 1, wherein said dispersion conveying step includes maintaining the dispersion at an elevated pressure, said throttling step including raising the pressure of the dispersion in the lower chamber of said at least two superimposed chambers.

5. The method of claim 1, wherein said dispersion conveying step includes inducing the dispersion to rise within an upright vessel having a shell which is tubular at least in the region of the upper chamber of said at least two superimposed chambers, said first throttling step including placing between said at least two chambers a substantially horizontal partition and providing the partition with at least one passage which induces an at least substantially horizontal flow of the dispersion from the lower chamber into the upper chamber of said at least two superimposed chambers and substantially tangentially of the shell.

6. The method of claim 1, wherein said first throttling step includes throttling the upward flow of the dispersion between a plurality of additional superimposed chambers at a level above the lower chamber of said at least one pair of chambers and at angularly offset locations of the path.

7. The method of claim 6, wherein said first throttling step further includes placing substantially horizontal partitions between superimposed chambers and providing the partitions with flow restricting passages which induce a substantially horizontal flow of the dispersion above the respective partitions.

8. The method of claim 1, wherein said returning step includes admitting at least a portion of the one stream into at least one of said chambers.

9. The method of claim 8, wherein said first throttling step includes installing partitions between neighboring chambers of said series of chambers, said admitting step including introducing said portion of the one stream at a level above at least one of the partitions and substantially tangentially of the respective chamber.

10. The method of claim 1 wherein the gaseous fraction forms bubbles which rise in the dispersion at a first speed, said dispersion conveying step and said first throttling step including maintaining the dispersion at an elevated pressure such that the speed of the dispersion in said path exceeds said first speed.

11. The method of claim 1, further comprising the steps of maintaining the dispersion in said path at an elevated pressure, reducing the pressure of the dispersion upon completion of said dividing step, and circulating at least the other stream of the dispersion to accelerate such other stream prior to said evacuating step.

12. The method of claim 1, further comprising the step of confining a carrier material living microorganisms thereon in at least one of said chambers so that the ascending dispersion is caused to intimately contact the microorganisms.

13. Apparatus for treating a liquid fraction with a gaseous fraction, comprising an upright vessel having a lower portion, an upper portion and at least one partition dividing the interior of the vessel into an upper and lower chamber between said upper and lower portions, said partition having at least one flow restricting passage, said lower portion having an inlet and said upper portion having an outlet; means for admitting into said inlet a dispersion of liquid and gaseous fraction at a pressure such that the dispersion rises in said vessel and flows through said passage, said passage being oriented to impart to a portion at least of the flow of dispersion a substantially helical shape and said vessel further comprising means for damming the flow of dispersion in aid upper portion; and a return conduit having an intake in said upper portion, a discharge end in said lower portion and at least one opening for admission of dispersion into said intake in the region of said damming means.

14. The apparatus of claim 13, wherein said vessel further comprises at least one additional substantially horizontal partition and an additional flow restricting passage in said additional partition.

15. The apparatus of claim 14, wherein said vessel further comprises a plurality of additional partitions with flow restricting passages, said partitions being substantially equidistant from each other intermediate the upper and lower portions of said vessel.

16. The apparatus of claim 13, wherein said vessel further comprises a tubular flow restricting member which defines said passage and a shell having a tubular portion surrounding said upper chamber, said member being disposed substantially tangentially of said tubular portion.

17. The apparatus of claim 16, wherein said member is disposed in said upper chamber.

18. The apparatus of claim 16, wherein said member is adjacent said tubular portion.

19. The apparatus of claim 13, further comprising means for diverting at least some dispersion from said conduit into at least one of said chambers.

20. The apparatus of claim 19, wherein said diverting means has an outlet adjacent said partition.

21. The apparatus of claim 13, wherein said conduit includes an upright pipe and said vessel further comprises a shell substantially concentrically surrounding said pipe.

22. The apparatus of claim 13, wherein said damming means includes a top wall and said intake is disposed beneath said top wall.

23. The apparatus of claim 22, wherein said conduit has a nipple which defines said intake.

24. The apparatus of claim 23, wherein said nipple is disposed substantially tangentially of said conduit.

25. The apparatus of claim 13, wherein said upper portion includes an enlarged receptacle above said damming means, said conduit including an upper end portion extending into said receptacle upwardly and beyond said damming means and having an open top to permit the dispersion to overflow into said receptacle, said outlet being provided in said receptacle at a level below the open top of said upper end portion.

26. The apparatus of claim 13, wherein said vessel further comprises a shell which spacedly surrounds said conduit, said partition being sealingly secured to said conduit and to said shell.

27. The apparatus of claim 13, wherein said admitting means includes means for maintaining the dispersion in the region of said damming means at a speed of approximately ten meters per second.

28. The apparatus of claim 13, further comprising carrier material for microorganisms in at least one of said chambers.

29. The apparatus of claim 28, wherein said admitting means includes means for inducing the flow of dispersion at a speed such that the carrier material remains in said one chamber while being contacted by the circulating dispersion.

* * * * *